Oct. 23, 1956     S. KLEIN     2,768,246
ELECTRICAL TRANSDUCER
Filed Jan. 24, 1952     3 Sheets—Sheet 2

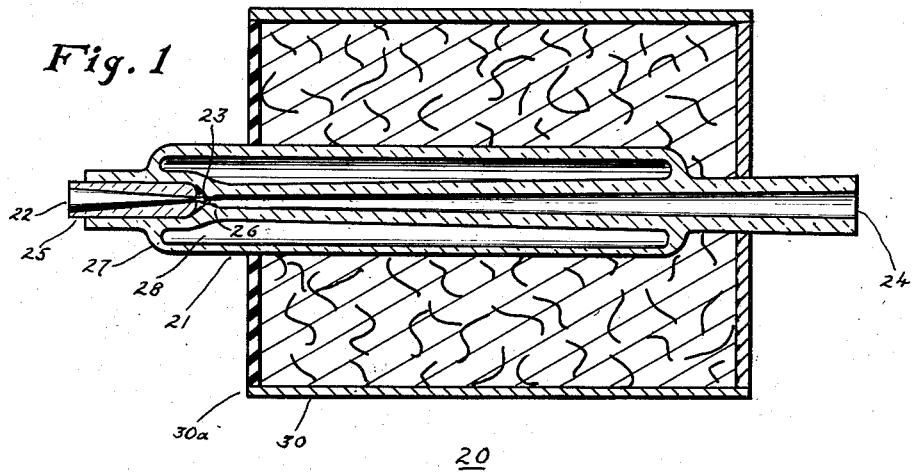
Fig. 1
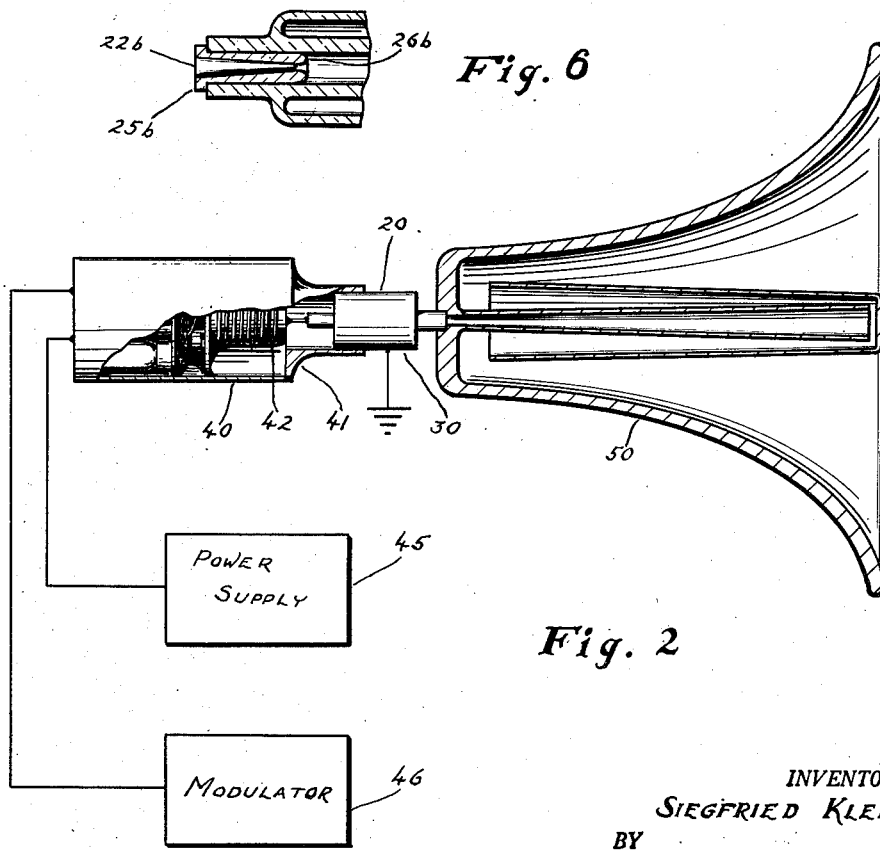
Fig. 6
Fig. 2
INVENTOR.
SIEGFRIED KLEIN

INVENTOR.
SIEGFRIED KLEIN
BY
Carlson, Pitzner, Hubbard, & Wolfe

Oct. 23, 1956  S. KLEIN  2,768,246
ELECTRICAL TRANSDUCER
Filed Jan. 24, 1952  3 Sheets-Sheet 3

INVENTOR.
SIEGFRIED KLEIN
BY
Carlson, Pitzner, Hubbard & Wolfe

United States Patent Office 2,768,246
Patented Oct. 23, 1956

2,768,246
ELECTRICAL TRANSDUCER

Siegfried Klein, Paris, France, assignor to Charles Legorju, Saint-Maur (La Varenne-Saint-Hilaire), France Application January 24, 1952, Serial No. 268,023

Claims priority, application France May 12, 1951

15 Claims. (Cl. 179—113)

The present invention relates to electric transducers intended particularly for the generation of elastic waves.

It is an object of the present invention to provide an electric transducer which is capable of converting an electric signal into an elastic wave and which is not subject to the limitations which are inherent in the various types of present day transducers. It is a more specific object to provide an electric transducer in which an electric signal may be converted into an elastic wave directly and without the use of a diaphragm, cone or other member having substantial inherent friction and inertia. It is another object to provide a novel transducer in which an electric signal is converted into an electric field under such circumstances that the field acts directly to set fluid in motion without the use of any mechanically vibrating member and in which extremely rapid transient response is assured.

It is a further object of the invention to provide a transducer which is capable of reproducing an electrical signal faithfully over a frequency range which is much wider than the range which can be covered by more conventional types of transducers. It is a still further object to provide a transducer which is inherently capable of covering not only the entire audible range but capable of going beyond the audible range, and has particular application as a powerful ultrasonic wave generator of substantially unlimited frequency range. It is a related object to provide a transducer which has no characteristic frequency of its own but is capable of operating over a wide range of frequency corresponding to the frequency of the input signal.

It is another object to provide a transducer which is capable of being employed as a radio or audio loudspeaker and which has linear output characteristics and other features making it ideally suited for use as a loudspeaker in high fidelity sound systems, theatres, and for use outdoors for military or other purposes where large areas are to be covered with maximum intelligibility. It is still another object to provide a transducer which is not only capable of high fidelity conversion of an electrical signal into sound but also capable of handling large amounts of power without multiplying the number of units. It is a related object to provide a transducer in which large amounts of audio power may be generated in an extremely small space.

It is another object to provide a transducer which is particularly suitable and intended for excitation by a modulated radio frequency carrier wave and which converts said wave directly into an elastic wave in strict accordance with the modulation component.

It is a further object to provide a transducer system which is of relatively high efficiency and which requires an electric signal of only a limited power for full excitation. It is a related object to provide a transducer system which is capable of being adequately excited by a modulated carrier wave which is modulated at a level substantially less than 100%.

It is another object to provide a high power transducer system which may have a total size and weight which is substantially less than the size and weight of more conventional systems. It is a related object to provide a transducer system which is extremely simple and requires less expensive components than conventional systems of comparable output. It is an object to provide a transducer system which is inherently reliable and which may be operated for long periods of time without reducing the fidelity of response or requiring adjustment or replacement of any element thereof.

It is another object to provide a transducer which in modified form is capable of setting up an elastic wave in water or other liquid and which has application to underwater signaling.

It is a further object to provide a transducer which may be adapted for use as a microphone or transient pressure-measuring device.

It is still a further object to provide a transducer system capable of producing ultraviolet radiation and ultrasonic waves for therapeutic purposes. It is another object to provide a source of ultraviolet radiation and ultrasonic waves of high intensity and localized to a high degree with provision for adjusting the frequency of the ultrasonic wave over a broad range.

Other objects and advantages of the present invention will become clear as the discussion proceeds, taken in connection with the following drawings in which:

Figure 1 is a transverse sectional view of an electric transducer constructed in accordance with the present invention.

Fig. 2 is a diagrammatic assembly drawing showing a loudspeaker employing the transducer of Fig. 1.

Fig. 6 is a fragmentary section showing the use of a coated inner electrode.

Figure 3:
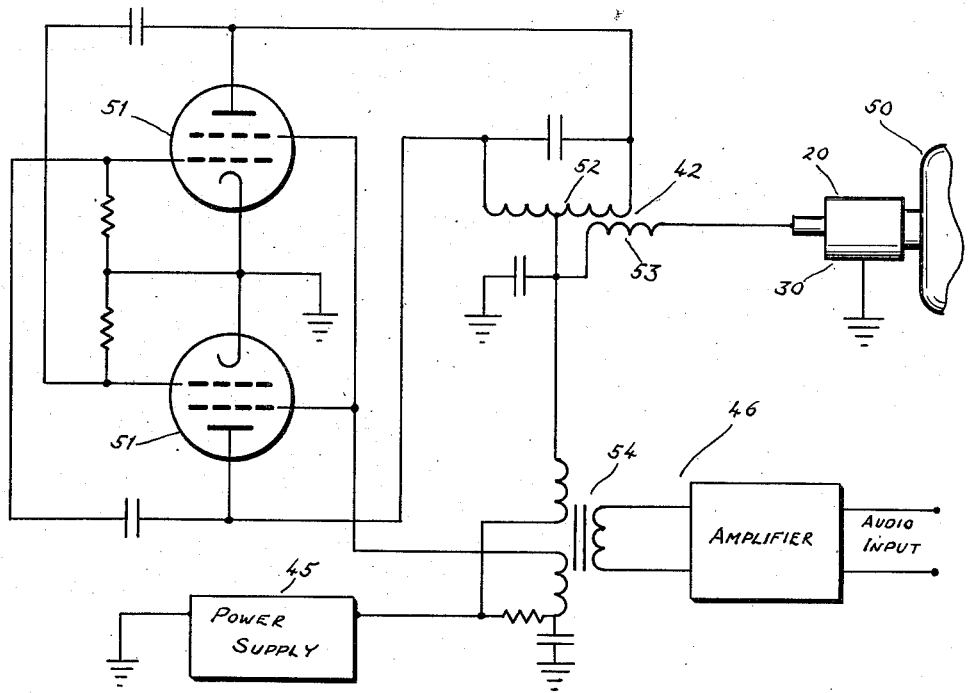
Fig. 3 is a schematic diagram of an oscillator and modulator used to excite the transducer.

While the invention is susceptible of various modifications I have shown in the drawings and will herein describe in detail only certain embodiments of the invention; it is to be understood, however, that I do not intend to limit the invention by such disclosure but aim to cover all modifications and alternative constructions falling within the spirit and scope of the invention as expressed in the appended claims.

Turning now to Figure 1, one embodiment of my transducer is indicated generally at 20. This transducer consists primarily of an elongated horn of refractory material indicated at 21 having a platinum electrode 22 at the left-hand end thereof. This electrode extends coaxially within the horn and has a tip 23 which is located at the small end or "origin" of the horn. The throat of the horn flares smoothly outwardly terminating in a mouth 24 at its opposite end. As will later be covered in detail, the flare is caused to increase as an exponential function from the electrode tip 23 to the mouth 24. For the purpose of protecting the electrode 22 and for enabling it to be bodily removed from the horn, the electrode is sealed in a tubular insert 25. The inner walls of the horn 21 are, in the illustrated embodiment, necked inwardly as indicated at 26 to define the orgin of the horn, and the insert is dimensioned so that the tip 23 is positively positioned in the region of the orgin. The electrode 22 preferably consists of a length of platinum rod or wire about 1/16 inch thick at the tip, although it will be apparent that electrodes of other metals having similar stable characteristics at high temperatures could be employed.

The horn 21, as well as the tubular insert, are advantageously formed of fused quartz, since quartz is physically strong, provides good thermal and electrical insulation, and will not fracture even when subjected to extremely large temperature gradients. It is possible that the dielectric and surface properties of fused quartz contribute to the result. In order to insulate the electrode 22 for high voltages and to enable the electrode tip 23 to operate at a high temperature while preventing heat loss to the outside, the horn 21 is provided with an outer jacket 27 which is evacuated and sealed forming an insulating space 28 which is annular in shape.

In accordance with the present invention, a high concentration of positive ions is created in the confined space ahead of the electrode 22 and the ions are subjected to a varying electric field for the creation of elastic energy. In accordance with a more specific aspect of the invention a rapidly varying high voltage signal is applied to the electrode 22 for the setting up of a corona discharge. Further in accordance with the invention, means are provided for setting up, in the corona zone ahead of tip 23, a varying electric field which is of approximately uniform intensity along the axis. The above is accomplished in the present embodiment by providing an outer electrode 30 in the form of a sleeve and by applying a modulated R. F. signal between the electrodes 22, 30. This sleeve is preferably arranged coaxially with respect to the inner tip 23 and is telescoped over the body portion of the horn 21 as shown. The edge 30a of the outer electrode is preferably spaced from the electrode tip 23 in the "forward" direction as shown in the drawing since this has been found to improve the effectiveness of the corona dicharge in the horn. The space between the horn and the outer electrode is filled with glass wool to provide additional thermal insulation as well as to eliminate the possibility of acoustic resonance. The over-all dimension of the horn illustrated in Fig. 1 is 6 3/16 inches and the drawing has been drawn to scale enabling the transducer to be readily reproduced by one skilled in this art.

A complete transducer system utilizing the transducer 20 described above is shown in Fig. 2. Modulated R. F. is supplied to the inner electrode 22 from an R. F. oscillator 40. To avoid losses the R. F. oscillator is mounted adjacent the transducer on a frame 41. Centered within this frame at the inboard end thereof is an R. F. transformer 42 which is preferably arranged coaxially with respect to the electrode 22. The R. F. oscillator 40 has a power supply 45 and a modulator 46.

At the mouth of the transducer is an external horn 50 which provides a smooth exponential enlargement for the horn 21. It will be understood that the external horn 50 need not take the form shown but may be of any desired shape provided only that there is a smooth transition with respect to the horn 21 and provided that the enlargement is at least approximately exponential.

If desired the cross section may vary in accordance with a parabolic or conical function. See, for example, H. F. Olson, Elements of Acoustical Engineering, pp. 85–97, Van Nostrand, 1940.

For the details of the R. F. oscillator 40, reference is made to Fig. 3 which sets forth the circuit diagram. The oscillator 40 is of a well-known type using a push-pull circuit with capacitive feed-back. In the present instance it has two tetrode tubes 51 with plates connected in push-pull to the transformer 42. The transformer has a primary winding 52 which comprises a tunable tank circuit as well as a secondary winding 53, one end of which is connected directly to the inner electrode 22 in the transducer. The secondary winding has a sufficient number of turns to step the R. F. voltage up to approximately 20,000 volts.

The R. F. output of the oscillator 40 is modulated by means of a plate modulation transformer 54 having secondary windings for both the plates and screens of the R. F. oscillator tube 51. Audio power is supplied to the modulation transformer at a suitable level from an audio amplifier 46. In one embodiment of the present invention the following circuit constants were employed for the R. F. oscillator and modulator:

Tube type—807
Grid resistors—6000 ohms
Grid capacitors—5 mmf.
Plate capacitor—75 mmf.
Coil 52—8 turns, 1½" dia. 1½" long
Coil 53—30 turns, 2¼" dia. 2½" long
R. F. bypass capacitors—500 mmf.
Screen filter capacitor—8 mf.

The frequency of the carrier wave may vary over wide limits without departing from the present invention. In one embodiment successful operation was secured using a carrier of 400 kilocycles. It was found however, that more satisfactory operation was obtained when using carriers using a considerably higher frequency than this, on the order of 3–30 megacycles. In the above oscillator a carrier of approximately 27 megacycles is used. Using a carrier above about 3 megacycles has resulted in elimination of background noise. The voltage applied to the plate terminals of the tube 51 from the power supply of 45 may be about 400 volts and the oscillator is loaded to a current drain of 50 milliamperes under steady state conditions giving a nominal R. F. power input of 20 watts. The voltage applied to the screen grids of the tubes 51 is approximately 300 volts. In practicing the invention the modulator 46 is adjusted to about ¾ watts of audio output to produce substantially less than 100% modulation. I prefer to use a modulation of approximately 60% although the modulation may go as low as 30% while still providing adequate excitation. I have found that the modulation should be kept below 100% in order to insure continuous corona discharge from the tip 23 of the inner electrode 22 at all points of the modulation cycle.

Figure 4:
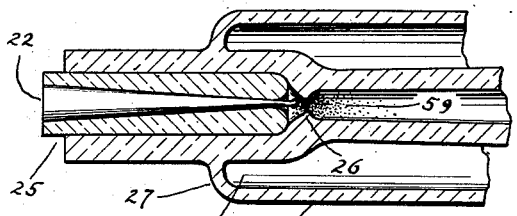
Fig. 4 is an enlarged fragmentary view of the inner electrode structure.

Under normal operating conditions power is applied to the oscillator 40 and within less than 5 seconds the tip 23 of the inner electrode becomes incandescent. The corona discharge is evidenced by a light blue "flame" which projects from the tip 23 for a distance of approximately one-half inch or more. With the outer electrode arranged as shown, this discharge extends symmetrically within the horn 21 and occupies the position indicated at 59 in Fig. 4. Under steady state conditions and without modulation being applied the discharge is steady and no sound is heard from the external horn. Upon applying modulation, however, the discharge increases with the modulation peaks, and the projected signal is clear and may be adjusted to a high level. The output level is controlled in the conventional fashion by varying the amplifier gain and may be varied smoothly from zero to maximum loudness without affecting the quality. Laboratory tests indicate that the response is linear over the entire audible range and extending upwardly far beyond the audible range. Such linearity is inherently more perfect than that which can be achieved with high quality loudspeakers of more conventional design.

The reasons for the extremely high fidelity obtainable using the present transducer are not fully appreciated. However, my studies have progressed far enough so that certain conclusions can be drawn. The discharge appears to be rather definitely of the corona type but having somewhat modified characteristics. It is believed that the operation may be explained as follows:

The corona discharge heats the tip 23 to such temperature that electrons are given off by thermionic emission. Under the influence of the electric field, the free electrons collide at high speed with the nitrogen, oxygen and other gas molecules in the air. This converts such molecules into a cloud of positive ions as well as a smaller number of negative ions. These ions are in addition to the ions which may be present in the air as a result of cosmic ray bombardment. Since the positive ions have much greater mass than the electrons, the ions have greater inertia and tend to vibrate through a relatively limited amplitude under the influence of the alternating electric field. It appears that in the course of such vibration the ions impinge upon the air molecules within the horn 21 and cause them to move in unison with the ions.

During the low points of the modulation cycle the voltage amplitudes are low and therefore the number of positive ions is relatively small. During the high points of the modulation, the potential between the electrodes is greater and the number of positive ions is therefore correspondingly greater. As the number of ions becomes greater, the number of impacts between the ions and the air molecules becomes greater and consequently the air pressure becomes greater. In short, the pressure varies in accordance with the modulation. The increases and decreases in the pressure exert corresponding piston-like thrusts on the air in the throat of the horn 21. These thrusts set up an elastic wave, or "sound," which is then matched to outer air impedance by the external horn 50.

There is still another factor which may be effective in producing the sound. During the low point of the modulation cycle the amplitude of ion vibration is very small, while at the modulation peaks the amplitude of vibration is relatively much larger. The greater the amplitude, the greater the kinetic energy of a given ion. The greater the kinetic energy the greater the pressure. Thus the pressure, for this additional reason, varies in accordance with the modulation. Both of the above factors are operative over the entire useful frequency range.

While the above paragraphs explain the mechanism by which the elastic wave is created, it is one of the features of the present invention that a particular electric field configuration is used along the axis of the corona zone. I have found that under operating conditions the field should have an intensity which, at a given instant of time, is relatively constant from point to point along the active corona zone. By active corona zone is meant the region in which the bulk of the collisions occur between the positive ions and the air molecules to cause the piston-like pressure variations on the air column mentioned above. By establishing the equi-intensity condition along the corona zone, the ions along the axis of such zone will be subjected to about the same accelerating potential. Thus the conditions at each point along the axis of the corona will be approximately the same or at least comparable. This condition may not be perfectly obtainable but may be approached to a relatively high degree by using an extensive outer electrode disposed adjacent the horn, for example, the sleeve electrode shown in the drawings. It is believed that this accounts in relatively large measure for the exceptional linearity of response of my device. Thus it is a part of my invention to control the distribution of field intensity to achieve the condition described above, and this may be accomplished to an even further degree by using an outer electrode of special shape, for example frusto-conical and tapering the opposite way from the horn, and with the sides of the electrode straight or curved.

It will be noted that there is a complete absence of any mechanical element such as a diaphragm, cone, or the like, for imparting movement to the air. Such mechanical elements have inherent inertia no matter how lightly they may be constructed and offer substantial resistance no matter how flexibly one may attempt to mount them.

The disadvantages of the conventional types of loudspeakers are all inherently overcome in the present transducer. Because of the lack of any mechanically vibrated member, the ions within the electric field are only subject to the variations in the field itself, and theoretically perfect reproduction is therefore obtainable for the first time. Wide frequency range and rapid transient response is assured. A further advantage of the present arrangement lies in the fact that, in the "corona zone," the ions are mixed with the air which is to be set in motion, thus eliminating any abrupt barrier such as a diaphragm. As a result, energy is applied to the air column, distributed over a substantial distance, permitting a relatively large amount of power to be absorbed even though the diameter of the air column in the region of the discharge point 23 is small. During the modulation peaks the length of the visible corona is seen to increase, more or less proportionately. The observed lengthening of the ionized region during modulation peaks, and therefore the length of the air column which is "coupled" to the discharge region, indicates that the transducer adapts itself automatically to the peak intensity of the audio signal being reproduced. The power capabilities of the present transducer in even the relatively small size illustrated make it suited for use in theaters or out-of-doors where large areas are to be covered with maximum intelligibility. To increase the power output it is only necessary to increase the size of the transducer and the input signal; the mode of operation does not change. No upper power limit is known.

While the above paragraphs have been directed primarily toward use of the device as a loudspeaker, it will be apparent that it is equally suited for use as a powerful generator of supersonic vibrations for use industrially or otherwise. Conventionally, piezo-electric crystals and magnetostrictive devices have been used to produce vibrations at ultrasonic frequencies. These suffer from the drawback that only a limited amount of power can be generated per unit area and over a relatively narrow frequency range, particularly when used in air. Generation in the high ultrasonic range is especially difficult. There is no such inherent limitation in the present device and the top frequency is limited only by vibration characteristics of the ions and air molecules. The industrial possibilities will be immediately apparent to one skilled in the art.

One of the advantages of the present transducer is the ease with which the emitting point 23 may be kept at a suitable temperature. This may be attributed to considerable extent to the insulating space 28 which surrounds both the emitting point 23 and the body portion of the horn. It has been found that the temperature of the tip 23 should be in the neighborhood of 1000 degrees centigrade for best results. It might be thought that such temperature would constitute a substantial disadvantage in the use of the present transducer. On the contrary, it is found that the device as a whole operates at a low temperature and that very little of the RF power need be expended solely for the purpose of keeping the tip 23 at its operating temperature. As a result of the disclosed construction, the thermal efficiency is high and a plentiful supply of electrons is given off by the tip to perpetuate the process of ionization.

It is also found that the electrical insulation provided by the quartz horn and provided by the evacuated space 28 is important in insuring that the discharge is directed along the throat of the horn.

Because of the concentration of heat at the tip 23 it might be considered that the tips would rapidly sputter away these requiring frequent replacement. Experience has shown, however, that this does not occur. Electrodes have been operated for several thousand hours without any noticeable signs of wear. This contrasts with the operation of the electrode 22 in open air where it is found that the tip 23 deteriorates at a relatively rapid rate, this in spite of the fact that the tip is in freely circulating air and thus, presumably, less subject to heat concentration. The reason for the observed long life of the electrodes when used in the disclosed construction is not fully undersood.

A further factor tending to increase the heat concentration at the electrode tip and the region of the corona is the dielectric loss which occurs in the quartz. It is possible that the heated walls contribute toward the result. Dielectric loss is, however, a relatively minor factor in heating the tip 23 compared to the heat produced by the bombardment of the electrode inherent in corona discharge.

It is possible that the efficiency of the transducer is due in part to the reduction in the density of the air in the corona region 59 brought about by the elevated temperature. While additional investigation will have to be made on this point, it is noteworthy that this factor is inherent in my construction.

Figure 5:
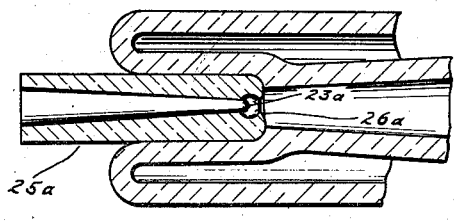
Fig. 5 is an enlarged fragmentary view showing a modified form of inner electrode arrangement.

While the arrangement shown in Fig. 1 is preferred it will be apparent that the various changes may be made without departing from the invention. For example, the electrode disclosed in Fig. 5 may be used. Here the electrode tip indicated at 23a does not extend outwardly from the tubular insert 25a but is slightly recessed as shown and spaced slightly behind a constriction 26a. This rearward spacing is, however, so slight that under operating conditions the corona extends well beyond the constriction, even during the low points of modulation and fidelity of reproduction is preserved. The modification shown in Fig. 5 is found to give better results at relatively low R. F. frequencies e. g. 400 kc. rather than at high frequencies on the order of 27 mc.

If desired the inner electrode may be coated for greater emission using the construction set forth in Fig. 6. Here the insert indicated at 25b has an emissive coating 26b which may be of the same composition as disclosed in my U. S. Letters Patent 2,524,227 issued on October 3, 1950. The electrode 22b in this embodiment is preferably recessed as shown. The throat of the horn is widened to accommodate a larger inner electrode surface; in other respects the arrangement is substantially the same as that shown in Figs. 1–3. If desired, the coating material may be applied directly to the electrode tip 23 in Fig. 1 or to the surrounding wals, although this has not been found to be necessary in practice where R. F. excitation is used.

It will be understood that other changes may be made without departing from the central invention. For example, the vacuum jacket may be eliminated for purposes of economy and the wall of the horn may be made of a single layer of quartz or heat resistant inert ceramic material. If desired, a solid insulating jacket may be provided which is made of any suitable material to provide both electrical and thermal insulation.

Figure 7:
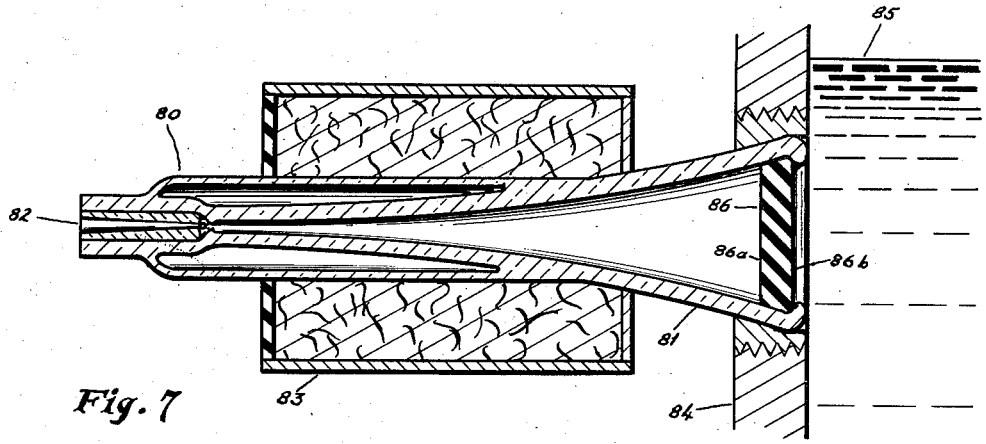
Fig. 7 is a modified form of the invention for setting up an elastic wave in a liquid.

While the invention has been discussed above as a device for setting up an acoustic wave in the air, the invention may be applied more broadly, for example, as shown in the various modifications which follow:

Referring to Fig. 7 a modification is shown which is capable of setting up an elastic wave in water. The transducer indicated at 80 has a horn 81, an inner electrode 82 and an outer electrode 83. The device is mounted in the barrier 84 which may, for example, be the side of the ship in contact with a body of water 85. Arranged at the mouth of the horn 81 is a plug of resilient material 86. In an experimental model which I constructed the plug 86 was made of live rubber and had a diameter of approximately 3 centimeters and a thickness of about 1 centimeter. Using the arrangement shown it was found possible to impart to the water a substantial amount of energy at ultrasonic frequency, it being understood that the electrode 82 may be arranged for excitation by an oscillator just as in the case of the preceding embodiment of Fig. 1. I propose, as part of my invention, that the plug 86 be so constructed as to be of low density along its left hand surface 86a and of a density approaching that of water along its right hand surface 86b. It is believed that such a variation in density will produce an increased efficiency of energy transmission between air and water.

I further propose as part of my invention that the entrapped air be placed under pressure for impedance matching purposes. The degree of pressure is a factor which depends on the specific structure of the ionophone and may readily be determined by one skilled in the art using an instrument capable of measuring the intensity of the output wave.

Figure 8:
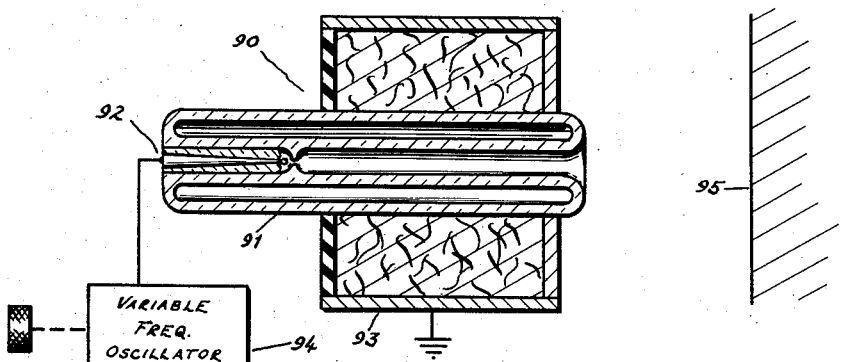
Fig. 8 is a modification for creating both ultraviolet and ultrasonic wave energy.

Fig. 8 shows a further modification of the present invention usable for therapeutic purposes in which the transducer indicated at 90 has a fore-shortened "horn" 91 which need not be of flaring shape, an inner electrode 92 and an outer electrode 93. The electrode 92 is connected for excitation by a variable frequency oscillator 94. This oscillator may be of the same type disclosed in Fig. 3 but so constructed that the tank circuit thereof may be manually tuned to a desired output frequency. It will be found that upon producing a corona discharge from the electrode 92, there will be projected from the horn 91 not only an ultrasonic wave but also relatively high intensity ultraviolet radiation. Both the ultrasonic wave and the radiation may be directed toward a body 95 and may be localized thereon to a much greater degree than is possible employing conventional sources of ultraviolet and ultrasonic vibrations. By varying the frequency of the variable frequency oscillator 94 the therapeutic effect of the ultrasonic wave may be adjusted. For this purpose modulation is not required and the frequency of the oscillator may range, if desired, from 20 kc. to 400 kc. depending upon the effect to be produced.

Figure 9:
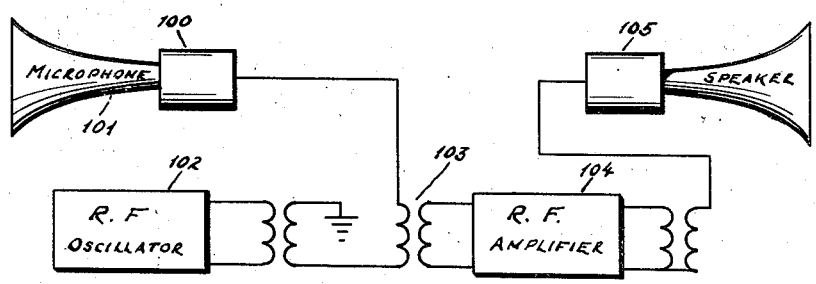
Fig. 9 shows a novel microphone and loudspeaker arrangement.

The use of the present transducer in a novel microphone circuit is shown in Fig. 9. Here the transducer 100 to be used as a microphone and having an external horn 101, is excited by an R. F. oscillator 102 which may for example be of the type shown in Fig. 3. Included in the circuit of the transducer is a transformer 103 coupled to the input of an R. F. amplifier 104. The latter drives a second transducer 104. Upon applying an acoustic signal to the ionophone 100, the air waves tend to modulator the R. F. current producing the discharge. The modulated R. F. signal is fed into the input of the R. F. amplifier and the amplified output is then fed into the second transducer 105. If desired, the percentage of modulation may be increased by feeding the signal from transformer 103 into a detector, audio amplifier and modulator, with the output of the modulator used to modulate an R. F. oscillator just as in Fig. 3.

The present transducer is not only an effective and novel tool in conventional applications, for example in replacing conventional loudspeakers, but it opens the door to entirely new lines of development. For example, the transducer may be used as the basis for a new design of radio receiver. Thus it may be excited by an R. F. amplifier fed directly from the I. F. stage of a radio receiver, thereby eliminating both the detector and audio amplifier. In addition to the simplification which is brought about, it is significant that the arrangement eliminates the non-linearity which is inherent in detector circuits. Or, if desired, the transducer-R. F. amplifier may be fed directly from the receiver R. F. stage, and the local oscillator and mixer as well as the I. F. stages in the receiver thereby eliminated.

By the term "horn" in the following claims is meant a cavity which is generally tubular in shape and which may be flared outwardly starting at the small end or origin.

I claim as my invention:

1. An electrical transducer for excitation by an electric signal comprising in combination a horn having a rear portion including the origin of refractory insulating material, means including a first electrode for providing a source of positive ions located in the region of the origin of said horn and obturating said origin, and a second electrode disposed around the rear part of said horn and so arranged in a forward direction with respect to the first electrode as to provide an electric field having a voltage gradient along the axis of said horn.

2. An electrical transducer for excitation by a modulated R. F. carrier wave having a voltage sufficient to cause corona discharge, the combination comprising a horn having a portion including the origin of refractory material, a discharge electrode having an exposed tip located at the origin of said horn and obturating said origin, and extending coaxially within said horn, the inner surface of said horn flaring outwardly starting at said tip, and a second electrode extending around the refractory portion and arranged with respect to said discharge electrode for directing a corona discharge therefrom along the throat of said horn.

3. An electrical transducer system comprising in combination a transducer having a horn, a discharge electrode having an exposed tip located at the origin of said horn, a second electrode disposed adjacent said horn and obturating said origin for directing a corona discharge therefrom along the throat of said horn, a source of R. F. carrier current connected to said electrodes, and means for modulating said current at substantially less than 100% modulation in order to maintain the corona discharge continuously throughout the modulation cycle.

4. An electrical transducer for excitation by a modulated R. F. signal comprising a horn having a rear portion thereof including the origin of insulating refractory material, a discharge electrode located in the region of the origin of said horn and, a second electrode surrounding the rear part of said horn for cooperating with the first electrode to set up a corona discharge from the latter, and means providing a vacuum jacket surrounding the horn and interposed between said electrodes.

5. An electrical transducer for excitation by a modulated R. F. signal comprising a horn having a rear portion thereof including the origin of insulating refractory material, a discharge electrode located in the region of the origin of said horn, a second electrode surrounding the rear part of said horn disposed adjacent the horn for cooperating with the first electrode to set up a corona discharge from the latter, and means providing a vacuum jacket surrounding the horn and interposed between said electrodes.

6. In an electrical transducer for excitation by an R. F. carrier wave having a voltage sufficient to cause corona discharge, the combination comprising a horn having a portion including the origin thereof of refractory insulating material, an inner discharge electrode having a discharge tip located at the region of the origin of said horn, a second electrode having an extensive surface disposed around the axis of the horn and lying outside of the region within the horn and being insulated from said region within the horn by said refractory insulating material said second electrode being offset axially from said discharge tip for directing the corona discharge along the throat of said horn.

7. An electrical transducer system comprising in combination a transducer having a horn having an origin, said horn having a portion including said origin of refractory insulating material, a first inner electrode located at the region of the origin of said horn and extending axially from the small end thereof to provide an electrode terminal, a grounded second electrode positioned ahead of the first electrode having an extensive surface disposed adjacent said horn but outside of the origin within said horn and being insulated from said origin by said refractory insulating material, a radio frequency step-up transformer arranged adjacent said terminal, said transformer having a primary winding arranged for connection to a source of radio frequency current and having a secondary winding having one terminal grounded and the other terminal connected directly to said electrode terminal for the setting up of a corona discharge in said horn.

8. An electrical transducer for setting up an elastic wave in a liquid medium comprising in combination a horn having a gaseous atmosphere wherein, said horn having an origin and consisting in part of refractory insulating material at the region of the origin, a discharge electrode having a discharge tip located at the origin of said horn, means including a second electrode for creating a corona discharge at said discharge electrode, a diaphragm of elastic material at the mouth of the horn for contact with said liquid medium said elastic material having a density intermediate the density of the gas in said horn and the density of said liquid medium.

9. An electrical transducer for setting up an elastic wave in a liquid medium comprising in combination a horn, said horn having an origin and consisting at least in part of refractory insulating material surrounding said horn region at the said origin, a discharge electrode having a discharge tip located at the origin of said horn, means including a second electrode for creating a corona discharge at said discharge electrode, a diaphragm of elastic material at the mouth of the horn for contact with said liquid medium, an atmosphere of pressurized gas in said horn, said elastic material having a density between the density of the gas in said horn and the density of said liquid medium.

10. An electrical transducer system for simultaneous generation of ultrasonic vibration and ultraviolet radiation for therapeutic use comprising in combination a horn of refractory insulating material, an inner discharge electrode at the origin of said horn, an outer second electrode having an extensive surface arranged adjacent said horn, a source of high voltage alternating current connected to said discharge electrode for setting up a corona discharge therefrom, the frequency of said source lying within the range of 20 to 400 kilocycles per second.

11. An electrical transducer for excitation by a radio frequency wave comprising in combination a tubular horn of refractory insulating material, an outer electrode having an extensive surface and arranged adjacent said horn, said outer electrode having the refractory insulating material between it and the region within said horn, an electrode insert arranged to be inserted axially into the small end of said horn and carrying a discharge electrode tip at one end thereof, said electrode insert and said horn having abutment means for positively seating said electrode insert so that the electrode tip is substantially at the origin of said horn.

12. An electrical transducer for excitation by a modulated R. F. carrier wave, comprising in combination a horn having a portion including the origin of refractory insulating material, a discharge electrode having a tip located at the origin of said horn and obturating said origin, a coating capable of emitting positive ions when heated, said coating being disposed to be heated by the discharge electrode and emitting positive ions in the region of said discharge electrode, a second electrode extending around the refractory portion of said horn and disposed in a forward direction with respect to the first electrode, said second electrode being insulated from the region in the horn by said refractory insulating material.

13. A transducer for effecting energy conversion between electrical and fluid waves, said transducer comprising a horn having an origin and having refractory insulating material in the region of the horn origin, a first electrode having an active portion obturating said horn origin and exposed to the fluid, a second electrode around the horn axis and spaced from the first electrode, refractory insulating means interposed between said two electrodes so that lines of potential between said electrodes pass serially through fluid around the active portion of the first electrode and through solid insulating means, said two electrodes being adapted to have a radio frequency potential therebetween sufficient to maintain a visible gas discharge at the active portion of the first electrode, said radio frequency potential constituting a carrier wave having an envelope corresponding to the wave to be transduced.

14. The transducer according to claim 13 wherein the second electrode is positioned forwardly of the first electrode.

15. The transducer according to claim 13 wherein said second electrode is in the form of a sleeve spaced from the horn and disposed around the outside thereof, said second electrode having the forward end thereof shaped to approach the horn and having the rear end thereof disposed forwardly of the first electrode.

References Cited in the file of this patent

UNITED STATES PATENTS

| | | |
|---|---|---|
| 1,680,694 | Ramsey | Aug. 14, 1928 |
| 1,685,075 | Lindenblad | Sept. 18, 1928 |
| 1,702,951 | Ruben | Feb. 19, 1929 |
| 1,723,244 | Lilienfeld | Aug. 6, 1929 |
| 1,751,888 | Ruben | Mar. 25, 1930 |
| 1,758,993 | Wolft | May 20, 1930 |
| 1,806,745 | De Forest | May 26, 1931 |